United States Patent
Morita et al.

(10) Patent No.: US 6,600,783 B1
(45) Date of Patent: Jul. 29, 2003

(54) APPARATUS AND METHOD OF ENCODING MOVING PICTURE SIGNAL

(75) Inventors: Kazuhiko Morita, Shinagawa-Ku (JP); Takayuki Sugahara, Yokosuka (JP); Mitsuaki Fujiwara, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 568 days.

(21) Appl. No.: 09/597,485

(22) Filed: Jun. 19, 2000

(30) Foreign Application Priority Data

Jun. 22, 1999 (JP) .......... 11-175154
Jun. 24, 1999 (JP) .......... 11-178090
Jul. 5, 1999 (JP) .......... 11-190143

(51) Int. Cl.$^7$ .............................. H04N 7/12
(52) U.S. Cl. .............. 375/240.03; 375/240.05
(58) Field of Search .............. 375/240.02, 240.03, 375/240.05; 348/419.1, 409.1; 382/251, 236; 386/111

(56) References Cited

U.S. PATENT DOCUMENTS

| | | | | |
|---|---|---|---|---|
| 5,459,515 A | * | 10/1995 | Chevance et al. | 348/402.1 |
| 5,627,938 A | * | 5/1997 | Johnston | 704/200.1 |
| 5,691,770 A | * | 11/1997 | Keesman et al. | 375/240.04 |
| 5,694,171 A | * | 12/1997 | Katto | 375/240.03 |
| 6,037,987 A | * | 3/2000 | Sethuraman | 375/240.03 |
| 6,259,739 B1 | * | 7/2001 | Kondo | 375/240.23 |
| 6,266,375 B1 | * | 7/2001 | Chang et al. | 375/240.03 |
| 6,377,624 B1 | * | 4/2002 | Keesman | 375/240.03 |
| 6,404,933 B1 | * | 6/2002 | Yamamoto | 382/251 |
| 6,438,167 B1 | * | 8/2002 | Shimizu et al. | 375/240.03 |
| 2002/0039387 A1 | * | 4/2002 | Auvray et al. | 375/240.18 |
| 2002/0131494 A1 | * | 9/2002 | Fukuda et al. | 375/240.03 |
| 2002/0136297 A1 | * | 9/2002 | Shimada et al. | 375/240.04 |

FOREIGN PATENT DOCUMENTS

| | | | |
|---|---|---|---|
| EP | 001063851 A2 | * 12/2000 | H04N/7/50 |
| JP | 06141298 | 8/1994 | |
| JP | 10164577 | 6/1998 | |
| JP | 10302396 | 11/1998 | |

OTHER PUBLICATIONS

Bilato et al, "Accurate bit-rate and quality control for the MPEG video coder", International Conference on Image Processing, v 3, pp. 571–574, Oct. 1997.*

Coene et al, "A fast route for application of rate-distortion optimal quantization in an MPEG video encoder", International Conference on Image Processing, vol. 1, pp. 825–828, Sep. 1996.*

Lee et al, "On the error distribution and scene change for the bit rate control of MPEG", Transaction on Consumer Electronics, vol. 39, Iss. 3, pp. 545–554, Jun. 1993.*

* cited by examiner

*Primary Examiner*—Vu Le
(74) *Attorney, Agent, or Firm*—Jacobson Holman PLLC

(57) ABSTRACT

Input moving pictures are encoded with motion-compensated prediction. Detected first is an mount of codes generated for each encoded picture of the input moving pictures. Detected next is an average quantization scale factor of quantization scale factors used for quantizing the pictures of the input moving pictures when encoded. Also detected is picture characteristics of at least the input moving pictures. Complexity of each picture is calculated in response to the mount of codes generated for each picture, the average quantization scale factor and the picture characteristics. An amount of codes to be allocated to a present picture to be encoded is decided in response to the mount of codes generated for each picture, picture characteristics and the complexity of each picture, for obtaining a quantization scale factor for the present picture.

19 Claims, 11 Drawing Sheets

APPARATUS AND METHOD OF ENCODING MOVING PICTURE SIGNAL

BACKGROUND OF THE INVENTION

The present invention relates to an apparatus and a method of encoding moving picture signals. Particularly, this invention relates to an apparatus and a method of encoding moving picture signals with code amount control for real time variable-bit rate encoding.

Moving picture Experts Group (MPEG)-2 has been established as the international standards for encoding moving picture signals, such as, TV signals.

MPEG-2 offers motion-compensated prediction and transform encoding as its two technical features.

Motion-Compensated Prediction: A frame of moving picture is divided into 16×16 blocks called macroblocks. For each macroblock, a motion amount called a motion vector is detected between the present picture frame to be coded and a reference frame which comes before or after the present picture frame on the time base by a predetermined number of frames. An encoded picture is generated on the basis of the reference frame and the motion vector.

Transform Encoding: A picture frame or a predictive error signal generated by motion-compensated prediction is compressed by Discrete Cosine Transform (DCT) as an orthogonal transforming technique.

Motion-compensated prediction in MPEG-2 generates moving pictures of three types; I-pictures (intra-coded pictures), P-pictures (predictive-coded pictures) and B-pictures (bidirectionally predictive-coded pictures).

I-pictures are subjected to DCT as they are, on the other hand, for P- and B-pictures, predictive error signals are subjected to DCT, for generating DCT coefficients.

The DCT coefficients are quantized with a quantization scale factor under code amount control.

The quantized DCT coefficients are encoded by variable-length encoding, with auxiliary data, such as, motion vectors, to generate a bit stream which will be an output coded data via buffer.

A quantization scale factor is determined by code amount control according to the amount of bit stream passing through the buffer.

The quantized DCT coefficients are further subjected to de-quantization and Inverse-DCT (IDCT) for local decoding, and stored in a frame memory per macroblock for motion-compensated prediction.

The amount of codes (bit rate) generated for each predetermined period in MPEG-2 is not constant due to variable-length encoding.

In order to overcome this problem, MPEG-2 has offered techniques of quantization scale factor adjustments per macroblock for achieving constant bit rate.

MPEG-2 Test Model 5 has proposed a technique of constant bit rate control for generating a constant amount of codes per Group of Pictures (GOP), for achieving constant transfer rate.

This technique, however, allocates almost the same amount of codes over the entire portions of a moving picture sequence. The constant amount code allocation causes deterioration of images due to insufficient code allocation to images of complex scenes which have a lot of data, on the other hand, unnecessary code amount allocation to images of plain scenes which have a few data.

This technique is, therefore, not a suitable bit rate control method for DVD-Video having a variable-transfer rate control function, for instance.

A technique of variable-bit rate control overcomes the problem of constant bit rate control for DVD-Videos, and is disclosed in Japanese Unexamined-Patent Publication No. 1994(6)-141298.

In this technique, an input moving picture is subjected to temporal (first) encoding with a fixed quantization scale factor, and the amount of generated codes is counted per specific period of time. A target transfer rate for each portion, such as, a frame, of the input moving picture is set on the basis of the counted code amount so that the amount of codes of the entire input moving picture becomes a specific value.

The input moving picture is then subjected to actual (second) encoding with bit rate adjustments so that a bit rate for each portion of the input moving picture becomes the target transfer rate.

This variable-bit rate control, however, requires two time-encoding, that is, temporal and actual encoding, thus not achieving real time control. The two time-encoding is called two pass-encoding hereinafter.

Contrary to such two pass-encoding, one pass (time)-encoding with variable-bit rate control has been introduced by Japanese Unexamined-Patent Publication No. 1998(10)-164577 for almost real time moving picture encoding.

This technique obtains picture complexity calculated by multiplying the amount of codes encoded so far and an average quantization scale factor for each picture. The ratio of the present picture complexity to average past picture complexity is used for deciding a target code amount or target quantization scale factor for variable-bit rate control.

Another technique of one pass-encoding with variable-bit rate control is disclosed in Unexamined-Patent Publication No. 1998(10)-302396.

This technique examines difficulty in encoding per predetermined period for obtaining a temporal code amount to be allocated for each predetermined period with reference to a standard encoding difficulty and code amount to be allocated.

The temporal code amount to be allocated is changed to an actual code amount to be allocated by comparing a code amount to be allocated Bav which is given by encoding with a fixed code amount to be allocated bav decided under actual storage capacity of a storage medium and a total actual code amount Bgen encoded so far; and allowing a code amount to be allocated equal to or larger than bav when Bav—bav is positive, thus achieving recording of a certain length of moving picture on a storage medium so that a total code amount generated for the certain length of moving picture is smaller than the storage capacity of the storage medium.

This one pass-encoding with variable-bit rate control also has the following disadvantages:

In this technique, the present picture complexity is obtained by temporarily encoding the present picture which will be encoded from now on or the picture complexity of the picture encoded just before and of the same picture-type is used as the present picture complexity without temporal encoding.

The one pass-encoding thus causes delay in encoding if it is temporal encoding and requires a bulk of circuitry.

Moreover, even though without such temporal encoding, when picture complexity varies on pictures, in other words, scene change occurs just before the present picture to be encoded, the picture complexity decided just before (the same picture-type) used as the present picture complexity would be different from actual picture complexity. This causes improper code amount allocation.

Different from the two pass-encoding, the one passencoding executes bit rate control without detecting how picture complexity varies for an input moving picture sequence.

This technique thus executes encoding under assumption that overall change in picture complexity of an input moving picture sequence is similar to that of average picture complexity of typical pictures.

This also causes improper code amount allocation, for example, for a moving picture sequence with monotonic increase in picture complexity (for example, the former part of the moving picture sequence is constituted by simple scenes easy for encoding and the latter part gradually complex scenes hard for encoding).

Code amounts to be allocated for such latter part go beyond a target code amount. Using-up of an excess code amount to be allocated (the total of differences between a target code amount and each generated code amount) for the simple scenes easy for encoding abruptly decreases code amounts to be allocated to cause picture degradation for, particularly, complex scenes hard for encoding, compared to encoding with fixed bit rate control.

On the other hand, for a moving picture sequence with the former part of complex scenes hard for encoding and the latter part of scenes having average picture complexity, code amounts are allocated for the latter part with reference to the picture complexity of the former part.

This causes allocation of extremely small amounts of code to the latter part of average scenes with picture degradation, thus results in amount of codes generated for the moving picture sequence extremely smaller than a target code amount, with ineffective usage of a storage medium.

This technique is capable of allocation of code amounts in which, when an allocated code amount is smaller than a predetermined code amount to be allocated bav decided on the basis of actual storage capacity of a storage medium, after this, code amount allocation beyond bav is made possible.

This achieves improvement in subjective picture quality for a moving picture sequence with the former part of simple scenes easy for encoding and the latter part of complex scenes hard for encoding.

Contrary to this, for a moving picture sequence with the former part of complex scenes hard for encoding and the latter part of simple scenes easy for encoding, improvement in subjective picture quality for the former part is impossible and an excess amount of codes is generated for the latter part when encoding is complete, with ineffective usage of a storage medium.

SUMMARY OF THE INVENTION

A purpose of the present invention is to provide an apparatus and a method of one pass-encoding with variable-bit rate control for achieving real-time encoding and effective code amount allocation with short delay in processing and small scale of circuitry.

Another purpose of the present invention is to provide an apparatus and a method of one pass-encoding with variable-bit rate control for achieving high picture quality of a moving picture sequence with monotonic increase in picture complexity, which is higher than that by encoding with fixed bit rate control, and also achieving effective code amount allocation.

Still another purpose of the present invention is to provide an apparatus and a method of one pass-encoding with variable-bit rate control for achieving effective code amount allocation over the entire moving picture sequence for high picture quality.

The present invention provides an apparatus for encoding input moving pictures with motion-compensated prediction. The apparatus includes: a code amount detector to detect an amount of codes generated for each encoded picture of the input moving pictures; a factor detector to detect an average quantization scale factor of quantization scale factors used for quantizing the pictures of the input moving pictures when encoded; a characteristics detector to detect picture characteristics of at least the input moving pictures; a calculator, responsive to the amount of codes generated for each picture, the average quantization scale factor and the picture characteristics, to calculate complexity of each picture; and a controller responsive to the amount of codes generated for each picture, picture characteristics and the complexity of each picture, to decide an amount of codes to be allocated to a present picture to be encoded, for obtaining a quantization scale factor for the present picture.

Furthermore, the present invention provides an apparatus for encoding input moving pictures with motion-compensated prediction. The apparatus includes: a code amount detector to detect an amount of codes generated for each encoded picture of the input moving pictures; a factor detector to detect an average quantization scale factor of quantization scale factors used for quantizing the pictures of the input moving pictures when encoded; a characteristics detector to detect picture characteristics of at least the input moving pictures; a calculator, responsive to the generated amount of codes and the average quantization scale factor, to calculate complexity of each encoded picture and a present picture to be encoded; a code amount decider to decide a target code amount for a predetermined period, based on the generated amount of codes; and a controller, responsive to the generated amount of codes generated, picture characteristics, complexity of the picture, and target code amount, to decide an amount of codes to be allocated to a present picture to be encoded, for obtaining a quantization scale factor for the present picture.

Moreover, the present invention provides an apparatus for encoding input moving pictures with motion-compensated prediction. The apparatus includes: a code amount detector to detect an amount of codes generated for each encoded picture of the input moving pictures; a factor detector to detect an average quantization scale factor of quantization scale factors used for quantizing the pictures of the input moving pictures when encoded; an amount setter to set a target code amount based on a recording time for recording the input moving pictures; a margin setter to set a margin of the generated amount of codes based on the recording time, the margin being modified based on a difference between the generated amount of codes and the target average code amount; and a controller to decide a code amount to be allocated for a predetermined period by adding the margin and the target average code amount, and obtaining a quantization scale factor for a present picture to be coded based on the code amount to be allocated, the present picture being encoded by using the obtained quantization scale factor when larger than a minimum quantization scale factor set based on the target average code amount.

Furthermore, the present invention provides a method of encoding input moving pictures with motion-compensated prediction. An amount of codes generated for each encoded picture of the input moving pictures is detected. An average quantization scale factor of quantization scale factors used for quantizing the pictures of the input moving pictures when encoded is detected. Picture characteristics of at least the input moving pictures is detected. Complexity of each picture is calculated in response to the amount of codes generated for each picture, the average quantization scale factor and the picture characteristics. An amount of codes to be allocated to a present picture to be encoded is decided in response to the amount of codes generated for each picture, picture characteristics and the complexity of each picture, for obtaining a quantization scale factor for the present picture.

Moreover, the present invention provides a method of encoding input moving pictures with motion-compensated prediction. An mount of codes generated for each encoded picture of the input moving pictures is detected. An average quantization scale factor of quantization scale factors used for quantizing the pictures of the input moving pictures when encoded is detected. Picture characteristics of at least the input moving pictures is detected. Complexity of each encoded picture and a present picture to be encoded are calculated in response to the generated amount of codes and the average quantization scale factor. A target code amount for a predetermined period is decided, based on the generated amount of codes. An amount of codes to be allocated to a present picture to be encoded is decided, in response to the generated amount of codes generated, picture characteristics, complexity of the picture, and target code amount, for obtaining a quantization scale factor for the present picture.

Moreover, the present invention provides a method of encoding input moving pictures with motion-compensated prediction. An amount of codes generated for each encoded picture of the input moving pictures is detected. An average quantization scale factor of quantization scale factors used for quantizing the pictures of the input moving pictures when encoded is detected. A target code amount is set based on a recording time for recording the input moving pictures. A margin of the generated amount of codes is set based on the recording time. The margin is modified based on a difference between the generated amount of codes and the target average code amount. A code amount to be allocated is, decided for a predetermined period by adding the margin and the target average code amount. A quantization scale factor for a present picture to be coded is obtained based on the code amount to be allocated. The present picture is encoded by using the obtained quantization scale factor when larger than a minimum quantization scale factor set based on the target average code amount.

DETAILED DESCRIPTION OF PREFERRED EMBODIMENTS

Preferred embodiments according to the present invention will be disclosed with reference to the attached drawings.

First Embodiment

Figure 1:
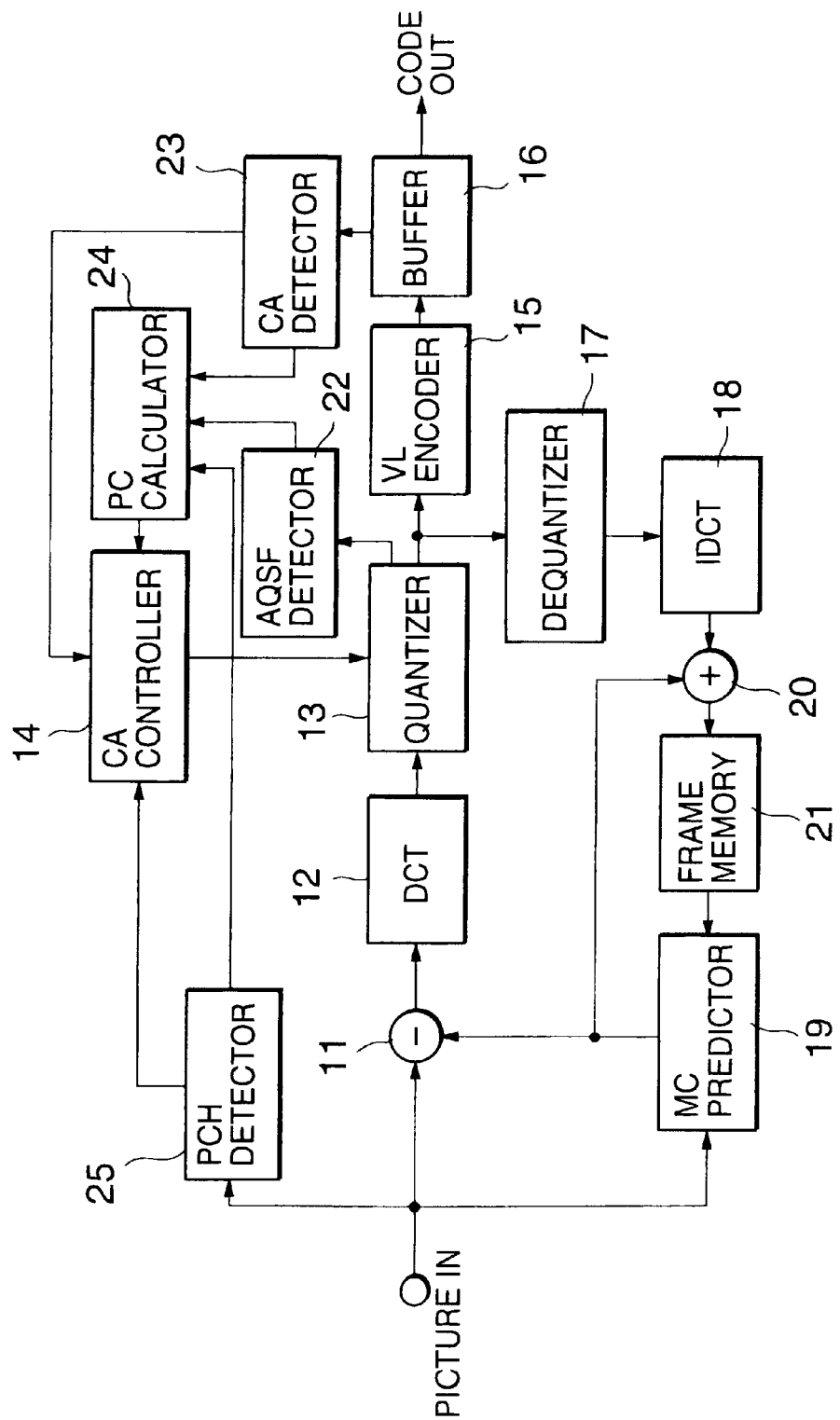
FIG. 1 shows a block diagram of a moving picture encoding apparatus as the first preferred embodiment according to the present invention.

A moving picture encoding apparatus as the first embodiment according to the present invention is disclosed with reference to FIG. 1.

An input moving picture is divided into macroblocks by a picture block divider (not shown) before supplied to the moving picture encoding apparatus.

For I-pictures of the input moving picture, input moving picture macroblocks are supplied to a discrete-cosine transformer (DCT) 12 via a subtracter 11 with no motion compensation. The transformed DCT coefficients are quantized by a quantizer 13 with a quantization scale factor fed by a code amount (CA) controller 14.

The quantized DCT coefficients are encoded by a variable-length (VL) encoder 15 and supplied to a buffer 16. Coded data is output after the code amount is adjusted by the buffer 16.

The quantized DCT coefficients are also supplied to a dequantizer 17 and an inverse-DCT (IDCT) 18 for local decoding.

The locally-decoded DCT coefficients are stored in a frame memory 21 for each macroblock via an adder 20 with no addition of the output of a motion-compensated (MC) predictor 19.

For P- and B-pictures of the input moving picture, input moving picture macroblocks and locally-decoded macroblocks stored in the frame memory 21 are supplied to the MC predictor 19 for motion vector detection and motion compensation. The resultant predictive macroblocks are subtracted from the input moving picture macroblocks by the subtracter 11 for generation of predictive error macroblocks.

The predictive error macroblocks are then supplied to the DCT 12.

The remaining procedure is the same as for the I-pictures. The DCT coefficients of the predictive error macroblocks obtained by the DCT 12 are quantized by the quantizer 13 with a quantization scale factor fed by the CA controller 14.

The quantized DCT coefficients of the predictive error macroblocks are encoded by the VL encoder 15 and supplied to the buffer 16. Coded data of the predictive error macroblocks is output after the code amount is adjusted by the buffer 16.

The quantized DCT coefficients of the predictive error macroblocks are also supplied to the dequantizer 17 and the IDCT 18 for local decoding.

The locally-decoded DCT coefficients of the predictive error macroblocks are stored in the frame memory 21 after the predictive macroblocks from the MC predictor 19 is added by the adder 20.

For the I-, P- and B-pictures, a quantization scale factor for each macroblock is supplied by the quantizer 13 to an average quantization scale factor (AQSF) detector 22 for addition of quantization scale factors for one frame to calculate an average quantization scale factor for one frame.

The buffer 16 always watches the code amounts generated by the VL encoder 15, and code amount data are supplied to a code amount (CA) detector 23.

The CA detector 23 adds the code amount data for each frame to detect a generated code amount for one frame.

The average quantization scale factor and the detected code amount are supplied to a picture complexity (PC) calculator 24 for each frame.

The input moving picture macroblocks are also supplied to a picture characteristics (PCH) detector 25 for detecting activity that is a parameter representing picture characteristics of each macroblock. The activity are added to each other for each frame and the resultant data is supplied to the PC calculator 24.

The picture characteristics detection precedes the encoding processing. The parameter representing the picture characteristics is preferably dispersal of luminance values or difference between pixels, and the like.

The PC calculator 24 multiplies the average quantization scale factor and the detected code amount, the multiplication result being used as a reference after applied a specific conversion processing, to obtain picture complexity for each frame.

Furthermore, the picture complexity are added to each other for a predetermined period of time for the respective picture-type (I, P and B), and the addition result is divided by the number of frames of the same picture-type for the same predetermined period to calculate average picture complexity Xi-ave (I-picture), Xp-ave (P-picture) and Xb-ave (B-picture).

The predetermined period of time stated above, preferably, corresponds to a predetermined specific number of frames from a picture that has been encoded just now to back to the 15th- or 300th-frame, for example. Or, the number of frames may be increased, for example, from an encoding starting frame to a picture that has been encoded just now. The specific number of frames will also be increased when the number of encoded frames is short for the predetermined period of time.

The processing up to obtaining picture complexity of pictures already encoded can be performed by a well known technique. However, it is one of the features of the present invention that the picture complexity of the present picture to be coded is estimated by means of activity of the present picture, which will be discussed in detail.

Picture complexity $Xi$, $Xp$ and $Xb$ of the present picture to be coded are estimated as follows:

$$\text{I-picture } Xi = Xi\text{-}p \cdot (ACTi/ACTi\text{-}p) \quad (1)$$

$$\text{P-picture } Xp = Xp\text{-}p \cdot (ACTp/ACTp\text{-}p) \quad (2)$$

$$\text{B-picture } Xb = Xb\text{-}p \cdot (ACTb/ACTb\text{-}p) \quad (3)$$

where "i", "p" and "b" represent I-, P- and B-picture, respectively; ACTi, ACTp and ACTb the activity of the present picture; Xi-p, Xp-p and Xb-p the picture complexity of the picture encoded just before the present picture for the same picture-type; and ACTi-p, ACTp-p and ACTb-p the activity of the picture encoded just before the present picture for the same picture-type.

When there is no frames encoded just before the present picture for the same picture-type in the initial stage, the picture complexity and activity of several pictures of each picture-type are obtained and statistically averaged in accordance with an average frequency of generation of moving pictures. The resultant value can be used as the initial value.

Following these processing, average picture complexity Xi-ave, Xp-ave and Xb-ave of each picture-type, and the estimated picture complexity Xi, Xp and Xb of the present picture to be coded are supplied to the CA controller 14 (FIG. 1).

The CA controller 14 performs setting of code amount to be allocated to the picture to be coded from now on and setting of quantization scale factor for variable-bit rate control.

An average code amount to be allocated Rave for one group of pictures (GOP), the unit of pictures to be coded, usually an I-picture interval, can be obtained as follows:

$$Rave = (BitRate/PictureRate) \cdot N \quad (4)$$

where BitRate represents a target average bit rate, PictureRate the number of frames per second, and N the number of frames of one GOP.

It is assumed that the picture complexity of each picture of one GOP including the present picture to be coded is equal to the estimated picture complexity of the present picture obtained by the PC calculator 24 when Rave is a code amount required to be allocated to one GOP having an average picture complexity.

A code amount Rc required to be allocated to one GOP for achieving constant picture quality is then obtained as follows:

$$\text{I-picture } Rc = Rave \cdot (Xi/Xi\text{-}ave) \quad (5)$$

$$\text{P-picture } Rc = Rave \cdot (Xp/Xp\text{-}ave) \quad (6)$$

$$\text{B-picture } Rc = Rave \cdot (Xb/Xb\text{-}ave) \quad (7)$$

A target code amount for the present picture to be coded from now on can be calculated with allocation of Rc to each picture of one GOP.

Discussed below is target code amount allocation processing in MPEG Test Model 5, as one example.

Target code amounts to be allocated Ti, Tb and Tp for each picture-type are obtained by the equations (8), (9) and (10) shown below.

In these equations, MAX[A, B] is an operation of selecting A or B which is larger than the other; Np and Nb represent the number of P- and B-picture frames, respectively; Kp and Kb the ratio of quantization scale factor for P- and B-picture frames, respectively; furthermore, Xi, Xp and Xb represent the picture complexity of I-, P- and B-pictures, respectively, which have been encoded just before the present pictures, in MPEG2 Test Model 5, however, they may be the picture complexity estimated for the present pictures which will be encoded from now on.
(I-picture)

$$Ti = MAX[A, B]$$

$$A = Rc/\{1 + Np \cdot Xp/(Xi \cdot Kp) + Nb \cdot Xb/(Xi \cdot Kb)\};$$

$$B = BitRate/(8 \cdot PictureRate) \quad (8)$$

(P-picture)

$$Tp = \mathrm{MAX}[C, D]$$

$$C = Rc/\{Np + Nb \cdot Kp \cdot Xb/(Kb \cdot Xp)\}$$

$$D = \mathrm{BitRate}/(8 \cdot \mathrm{PictureRate}) \quad (9)$$

(B-picture)

$$Tb = \mathrm{MAX}[E, F]$$

$$E = Rc/\{Nb + Np \cdot Kb \cdot Xp/(Kp \cdot Xb)\}$$

$$F = \mathrm{BitRate}/(8 \cdot \mathrm{PictureRate}) \quad (10)$$

The quantization scale factor for each macroblock is decided by the MPEG2 Test Model 5 technique on the basis of the above target code amounts to be allocated and the code amount stored in the buffer 16 that has been generated for each macroblock and detected by the CA detector 23.

The PCH detector 25 supplies the activity for each macroblock to the CA controller 14 for adaptive quantization control to adjust quantization scale factor for each macrblock on the basis of the activity in MPEG Test Model 5. The adaptive quantization control is not a must, and the quantization scale factor decision processing is not limited to the one discussed so far.

The quantization scale factor for each macroblock generated by the CA controller 14 is supplied to the quantizer 13 for quantizing the present picture that is the DCT coefficients of a macroblock of the input picture (I-picture) or a predictive error macroblock (P- or B-picture).

The quantization result is encoded by the VL encoder 15 and output after the code amount is adjusted by the buffer 16.

The quantization scale factor for each macroblock is supplied from the quantizer 13 to the AQSF detector 22; and the code amount in the buffer 16 is supplied to the CA detector 23, for code amount control processing for the subsequent picture.

Second Embodiment

Figure 2:
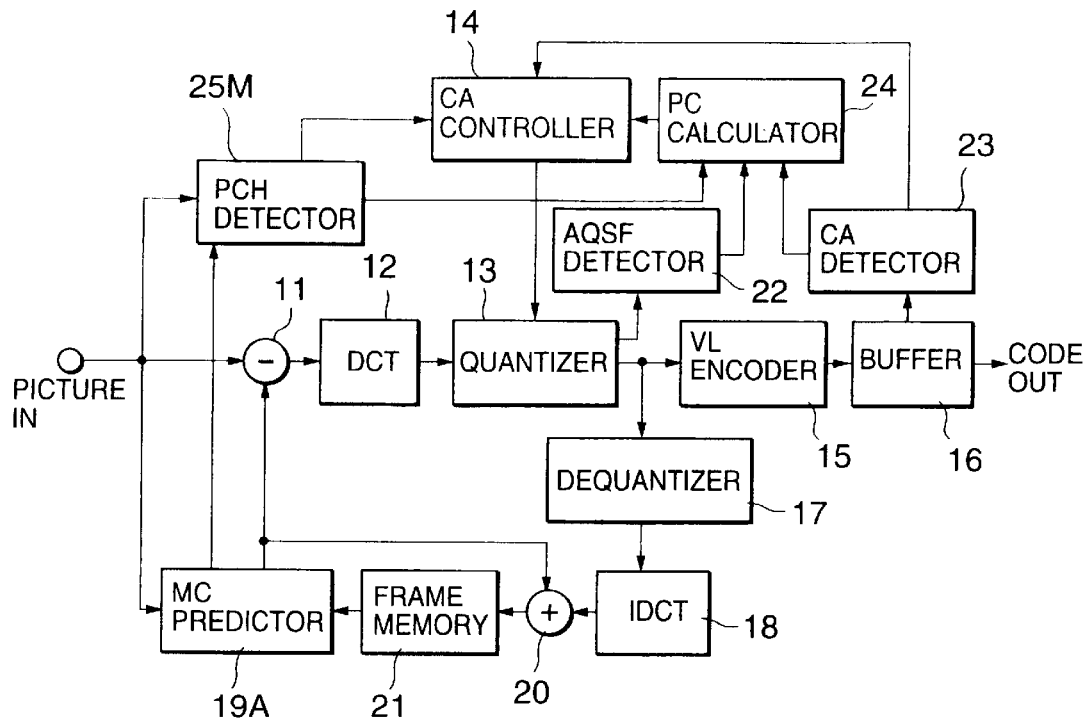
FIG. 2 shows a block diagram of a moving picture encoding apparatus as the second preferred embodiment according to the present invention.

A moving picture encoding apparatus as the second preferred embodiment according to the present invention is disclosed with reference to FIG. 2.

Elements in this embodiment that are the same as or analogous to elements in the first embodiment are referenced by the same reference numbers and will not be explained in detail.

The difference between the first and the second embodiments is that the latter has a picture characteristics (PCH) detector 25M that receives a motion-compensated signal from a motion-compensated (MC) predictor 19A.

Figure 3:
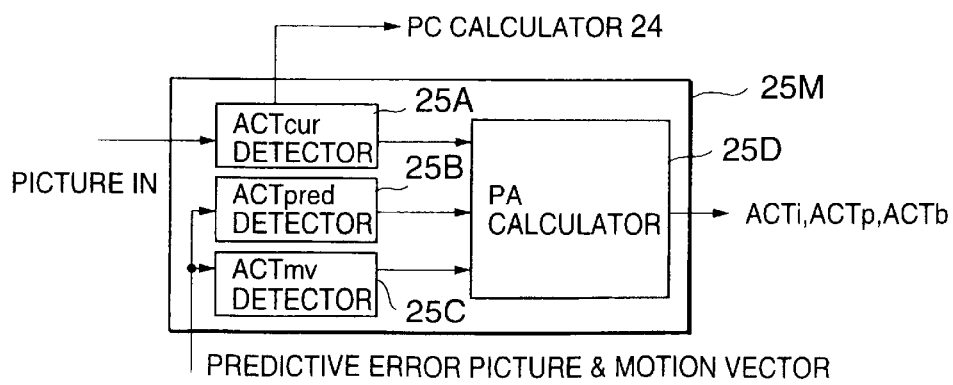
FIG. 3 shows a block diagram of a picture characteristics detector of the moving picture encoding apparatus shown in FIG. 2.

As shown in FIG. 3, the PCH detector 25M is provided with an ACTcur detector 25A, an ACTpred detector 25B, an ACTmv detector 25C, and a picture activity (PA) calculator 25D.

Like the first embodiment, an input moving picture is divided into macroblocks by a picture block divider (not shown) before supplied to the moving picture encoding apparatus.

For I-pictures, input moving picture macroblocks are supplied to the ACTcur detector 25A for detection of activity (ACTcur) per macroblock for each frame. The activity is a parameter that represents the picture characteristics. The parameter is preferably dispersal of luminance values or difference between pixels, and the like.

The activity of I-picture macroblocks for which motion-compensated prediction is not required are added to each other for each frame, and the addition result is supplied, as I-picture activity ACTi, to the PC calculator 24.

On the other hand, for P- and B-pictures, besides an input moving picture macroblock, macroblocks supplied to the PCH detector 25M are a predictive error picture macroblock obtained by motion-compensated prediction or a macroblock difference (for motion vector detection) between the input moving picture macroblock to be coded and a reference picture macroblock, and motion vectors used for motion-compensated prediction, from the MC predictor 19A.

Like I-pictures, activity ACTcur is detected for each macroblock by the ACTcur detector 25A for input P- and B-pictures.

For the predictive error macroblock or the macroblock difference, predictive activity ACTpred is detected by the ACTpred detector 25B by using a sum of absolute errors or a sum of square errors of the macroblock difference.

The motion vectors used for motion-compensated prediction are supplied to the ACTmv detector 25C for obtaining the absolute value ACTmv of the difference between vector components in macroblocks adjacent to each other.

ACTmb is then obtained by the following equation (11) for each macroblock.

$$ACTmb = a \cdot ACTcur + b \cdot ACTpred + c \cdot ACTmv \quad (11)$$

The constants "a", "b" and "c" are selected according to the picture-type or the macroblock prediction-type, namely, intra-prediction, uni-directional prediction or bidirectional prediction.

For intra-prediction, zero is selected as both the constants "b" and "c" because P- and B-pictures are not subjected to prediction, the same as for I-pictures; and a large value is selected as the constant "a" because more code would be generated for P- and B-picture macroblocks than for those subjected to uni-directional or bidirectional prediction.

The activity detection processing in accordance with picture-type or the macroblock prediction-type in the second embodiment achieves picture complexity estimation that matches the encoding characteristics more than the first embodiment.

As already disclosed, the first embodiment obtains the average picture complexity required to obtain the code amount Rc to be allocated for one GOP in accordance with picture-type to be coded.

Not only to this, the code amount Rc can be obtained by using the following equation (12):

$$Rc = Rave \cdot (Xk/X\text{-}ave) \quad (12)$$

where Rave represents the average code amount to be allocated, X-ave the average picture complexity obtained by adding the picture complexity of each frame within a predetermined period without respect to picture-type and dividing the addition result by the number of frames within the predetermined period, and "k"=i, p or b.

The equation (12) can be applied to the second embodiment.

The first and the second embodiments are disclosed with three picture-types, namely, I-, P- and B-pictures. Not only this, two types, for example, I- and P-pictures or I- and B-pictures, and also only the I-pictures free from motion-compensated prediction can be applied to the first and the second embodiments.

The application of only I-pictures to the second embodiment is equal to the first embodiment because the input to the PCH detector 25M are input I-picture macroblocks only.

Third Embodiment

Figure 4:
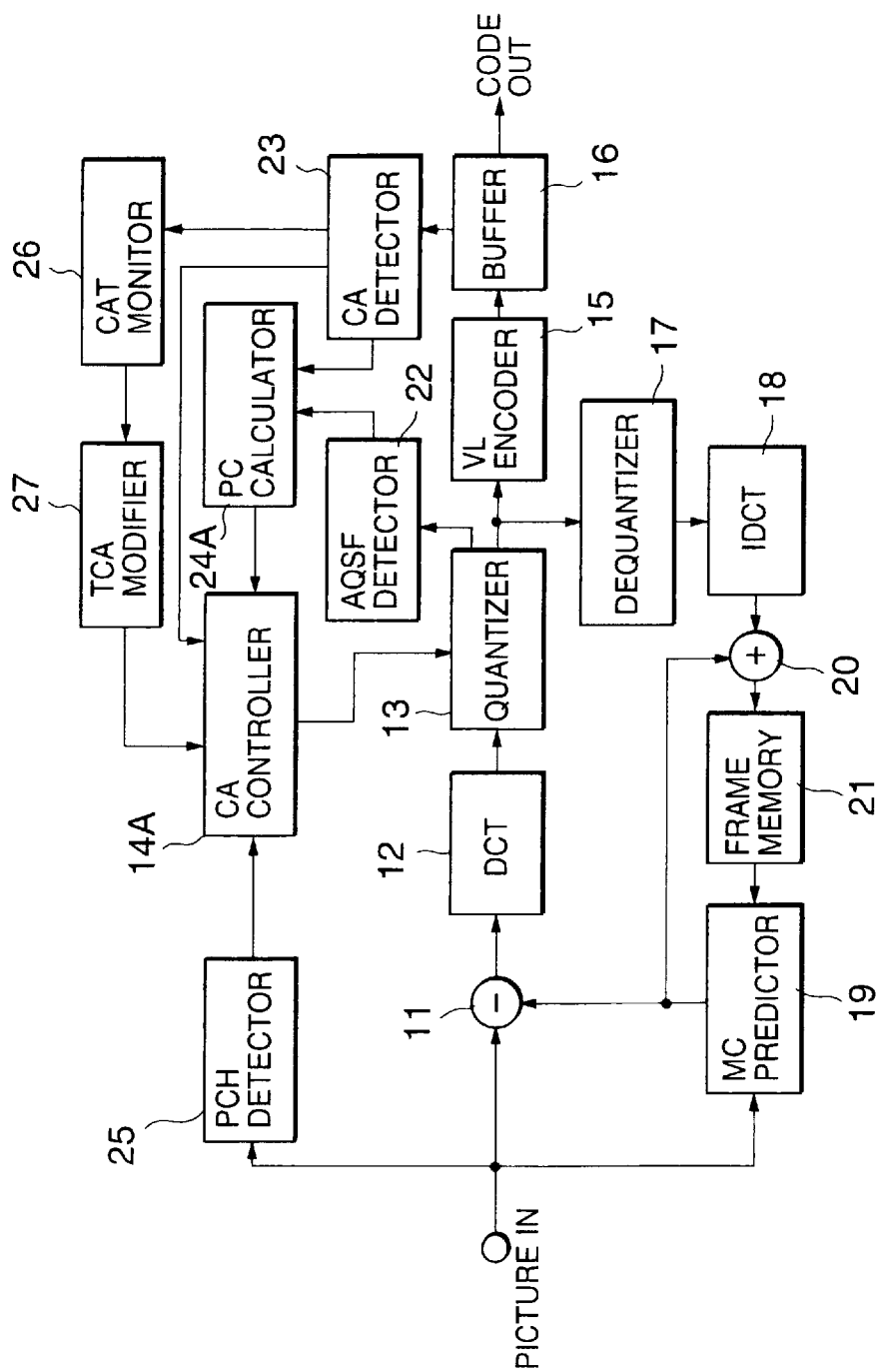
FIG. 4 shows a block diagram of a moving picture encoding apparatus as the third preferred embodiment according to the present invention.

A moving picture encoding apparatus as the third preferred embodiment according to the present invention is disclosed with reference to FIG. 4.

Elements in this embodiment that are the same as or analogous to elements in the first embodiment are referenced by the same reference numbers and will not be explained in detail.

A difference between the first and the third embodiments is that the latter has a code amount transition (CAT) monitor 26 and a target code amount (TCA) modifier 27. The other difference is that a picture complexity (PC) calculator 24A for the third embodiment does not require activity detected by the PCH detector 25.

The code amount detected by the code amount detector 23 for one frame is supplied to the CAT monitor 26. The monitor 26 adds the code amounts of sequential frames to calculate an actual total code amount Sreal of the moving picture having the number of already encoded frames FrameSum from the head to the present frame of the moving picture sequence; and also divides the total code amount of the pictures from the picture already encoded a predetermined period ago to the present picture now being encoded by the number of frames within the predetermined period to calculate an actual average bit rate Rreal for the predetermined period.

Figure 5:
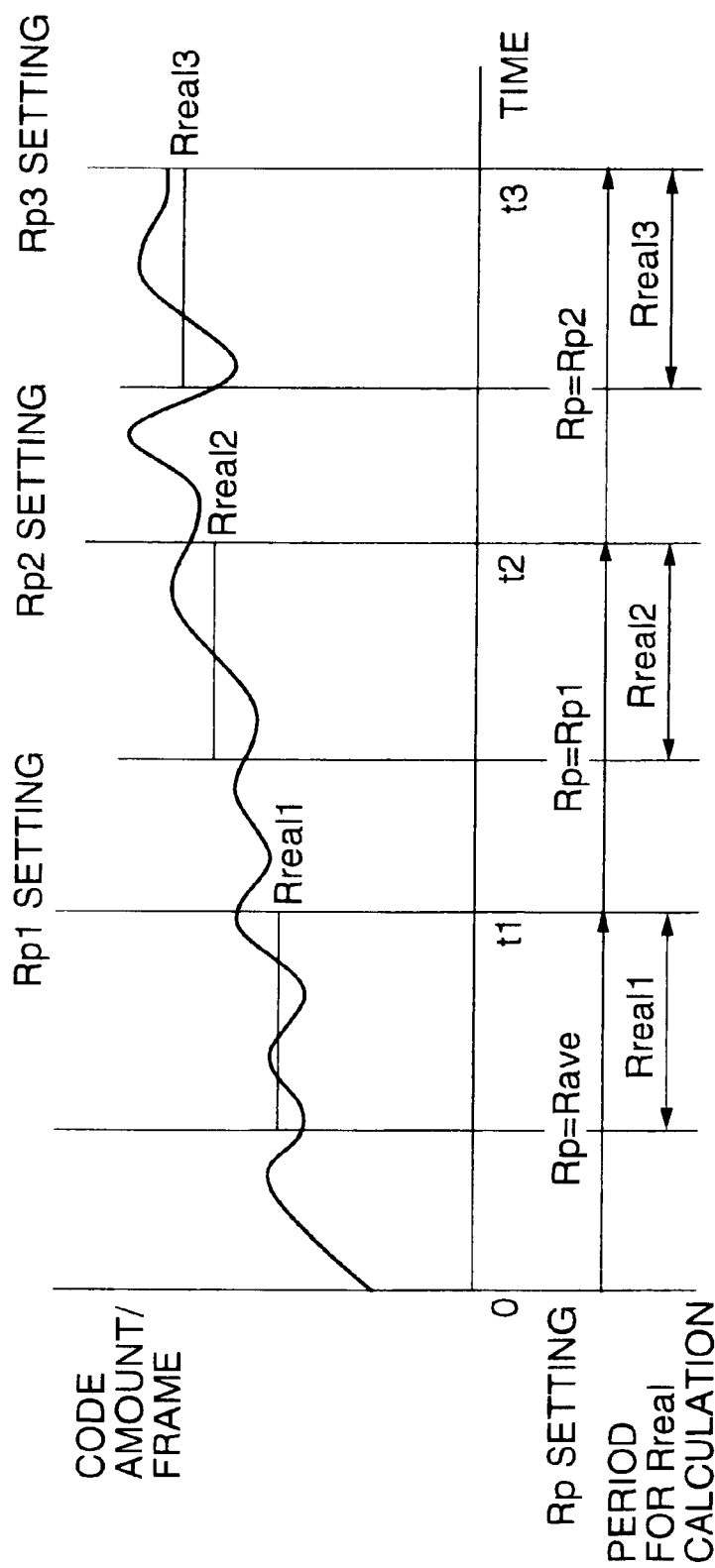
FIG. 5 indicates code amount transition in the third preferred embodiment.

As illustrated in FIG. 5, the picture as the starting point for calculation of Rreal is shifted in accordance with the development of encoding processing so that the number of frames within a predetermined period is always constant, namely, the periods Rreal1, Rreal2 and Rreal3 for calculating actual average bit rates.

The actual average bit rate calculation is performed periodically, and Rreal which has been calculated just before the present Rreal to be calculated is set as Real-old.

When Rreal is decided, simultaneously, Rdiff representing the difference between Rreal and the average target bit rate Rave which is decided before encoding, Rinc-ratio the increase in Rreal, and Sdiff the difference between the actual total code amount Sreal and a target total code amount to be generated Rave x FrameSum from the head to the present frames of a moving picture sequence are calculated by the following equations (13), (14) and (15), the obtained values being supplied to the TCA modifier 27.

$$Rdiff = Rave - Rreal \quad (13)$$

$$Rinc\text{-}ratio = Rreal/Rreal\text{-}old \quad (14)$$

$$Sdiff = Rave \times FrameSum - Sreal \quad (15)$$

The average target bit rate Rave is decided by using, for example, for storage media, the moving picture data storage capacity and the time for recording a moving picture sequence, Rave thus corresponding to the average bit rate obtained by encoding under fixed bit rate control.

Broadcasting and communications media are mainly subjected to peak rate (the maximum transfer rate), not to an average bit rate which is not a must, however, once an average transfer bandwidth to be allocated is set, the average target bit rate Rave is decided by using the bandwidth.

The TCA modifier 27 decides a target code amount Rp at the encoding starting point by using a predetermined Rave, as shown in FIG. 5.

The TCA modifier 27 modifies or updates Rp according to the processing using a predetermined function having factors that are some of Rdiff, Rinc-ratio and Sdiff and Rave, when Rreal, Rdiff, etc., are supplied from the CAT monitor 26, with the development of encoding.

Also illustrated in FIG. 5 is the relationship between the Rreal calculation period and the Rp setting (updating) period with the transition of code amount for each frame.

The function for deciding the target code amount Rp is preferably as follows, for example:

[Function 1]

$$Rp = Rave + a \times Rdiff \quad (16)$$

where "a" is a constant. This function is used when the generated code amount is too large, namely, Rdiff<R1(<0) and Sdiff<S1. Or, $$Rp = Rave + b \times Rdiff \quad (17)$$

where "b" is a constant. This function is used when the generated code amount is too small, namely, Rdiff>R2 (>0) and Sdiff>S2.

[Function 2]

$$Rp = Rp\text{-}old \times c/Rinc\text{-}ratio \quad (18)$$

where "c" is a constant. This function is used when the generated code amount is too large and also the amount increases monotonously, namely, Sdiff+margin<0 and Rinc-ratio>1.

In these functions, R1 and R2 and also S1 and S2 represent the values on the border between Rdiff and Sdiff, obtained by the equations (13) and (15), respectively, used for deciding whether to update Rp; "margin" the value for allowing code amount to increase over a target amount during bit rate control.

The target code amount Rp updated by the TCA modifier 27 is then supplied to a code amount (CA) controller 14A.

In this third embodiment, the picture complexity of the I-P- and B-pictures encoded lastly are set as the present picture complexity Xi, Xp and Xb.

Average picture complexity Xi-ave, Xp-ave and Xb-ave and Xi, Xp and Xb for the three picture-types, and also Rp are supplied to the CA controller 14A to set quantization scale factor for variable-bit rate control.

Fourth Embodiment

Figure 6:
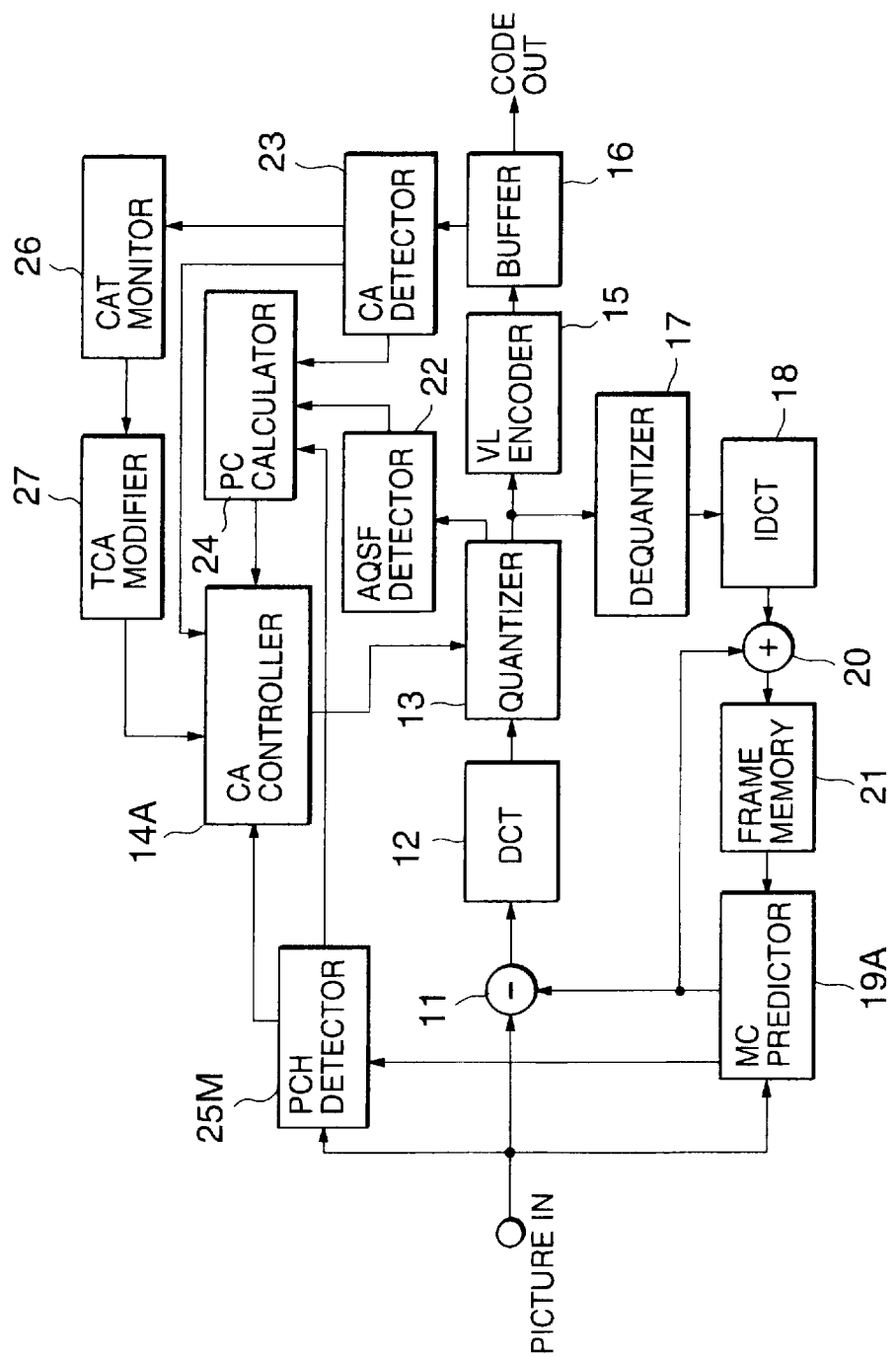
FIG. 6 shows a block diagram of a moving picture encoding apparatus as the fourth preferred embodiment according to the present invention.

A moving picture encoding apparatus as the fourth preferred embodiment according to the present invention is disclosed with reference to FIG. 6.

Elements in this embodiment that are the same as or analogous to elements in the embodiments disclosed so far are referenced by the same reference numbers and will not be explained in detail.

The third embodiment obtains the present picture complexity by using the picture complexity of the same picture-type encoded lastly, namely, the past picture complexity.

On the other hand, the fourth embodiment obtains the present picture complexity by using the activity of the present picture to be encoded from now on.

The processing listed below which are used for the third embodiment are also applied to the fourth embodiment:

I-, P- and B- picture encoding;

Detection of generated code amounts (CA detector 23);

Calculation of Rreal and so on (CAT monitor 26);

Rp updating (TCA modifier 27);

Calculation of picture complexity of already encoded frames and average picture complexity Xi-ave, Xp-ave and Xb-ave for the three picture-types (PC calculator 24); and Code amount control (CA controller 14).

Differences between the third and the fourth embodiments are that the latter has the picture characteristics (PCH)

detector 25M shown in FIG. 3, and the picture complexity (PC) calculator 24 that receives activity supplied from the PCH detector 25M.

The PCH detector 25M can supply the activity of input picture macroblocks to the CA controller 14A for adaptive quantization control processing, also in the fourth embodiment.

In the fourth embodiment, the PC calculator 24 estimates the present picture complexity by using the activity of the present picture to be coded from now on sent from the PCH detector 25M, with respect to the picture complexity of each already encoded frame.

Fifth Embodiment

Figure 7:
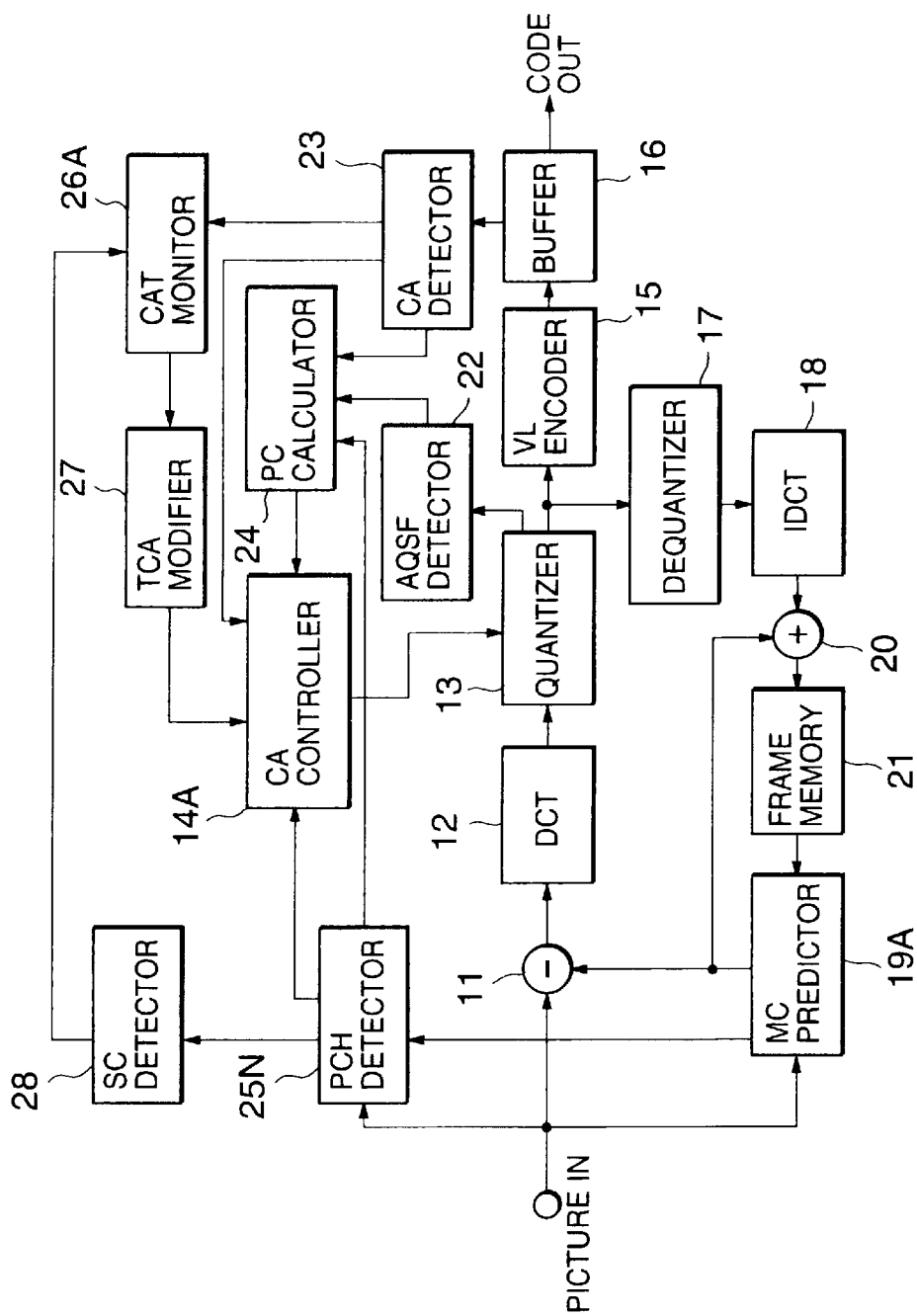
FIG. 7 shows a block diagram of a moving picture encoding apparatus as the fifth preferred embodiment according to the present invention.

A moving picture encoding apparatus as the fifth preferred embodiment according to the present invention is disclosed with reference to FIG. 7.

Elements in this embodiment that are the same as or analogous to elements in the embodiments disclosed so far are referenced by the same reference numbers and will not be explained in detail.

The differences between the fourth and the fifth embodiments are that the latter has a picture characteristics (PCH) detector 25N, a scene change (SC) detector 28 and a code amount transition (CAT) monitor 26A.

The PCH detector 25N supplies scene change detection data to the SC detector 28 for scene change detection.

On detection of the occurrence of scene change on a frame, the SC detector 28 supplies location data indicating the location of the frame on which scene change has occurred to the CAT monitor 26A.

The scene change detection data preferably indicates change in input picture activity, change in the number of intra-macroblcoks for each frame, and the like. When such a change goes beyond a predetermined level on a frame, it is detected that scene change has occurred on the frame.

On detection of scene change, the CAT monitor 26A halts calculation of the actual average bit rate Rreal for a predetermined period, on the frame that has come just before the frame on which scene change has occurred, and sets a new period for Rreal calculation.

The Rreal calculation to be performed just before scene change is previously selected from the following processing:

obtaining Rreal for a Rreal period shorter than a predetermined period;

setting Rreal-old that is the average bit rate for the period before the Rreal period, as Rreal; or newly setting a Rreal period that goes back by a predetermined period from the frame that has come just before the frame on which scene change has occurred.

In addition to the Rreal, the values obtained by the CAT monitor 26A are Rdiff that represents the difference between Rreal and the average target bit rate Rave that is set before encoding processing, Rinc-ratio representing increase in Rreal, and Sdiff that represents the difference between Sreal and a target total code amount to be generated, like the third embodiment.

These values are supplied to the TCA modifier 27 for the target code amount Rp updating which is performed mainly any time when scene change occurs.

The Rp updating on occurrence of scene change makes hard to notice the difference in picture quality before and after the updating, which would otherwise be easily noticed when the target code amount to be updated is larger than the former amount. In detail, the Rp updating is performed just on the occurrence of scene change when the scene change period is shorter than a predetermined period.

No occurrence of scene change for a particular period raises a possibility of a big difference (which cannot be ignored) between a target code amount and an actually generated code amount. In this case, also, performing Rp updating just on the occurrence of scene change makes hard to notice the difference in picture quality before and after the updating, compared to Rp updating for a certain period without respect to scene change.

Figure 8:
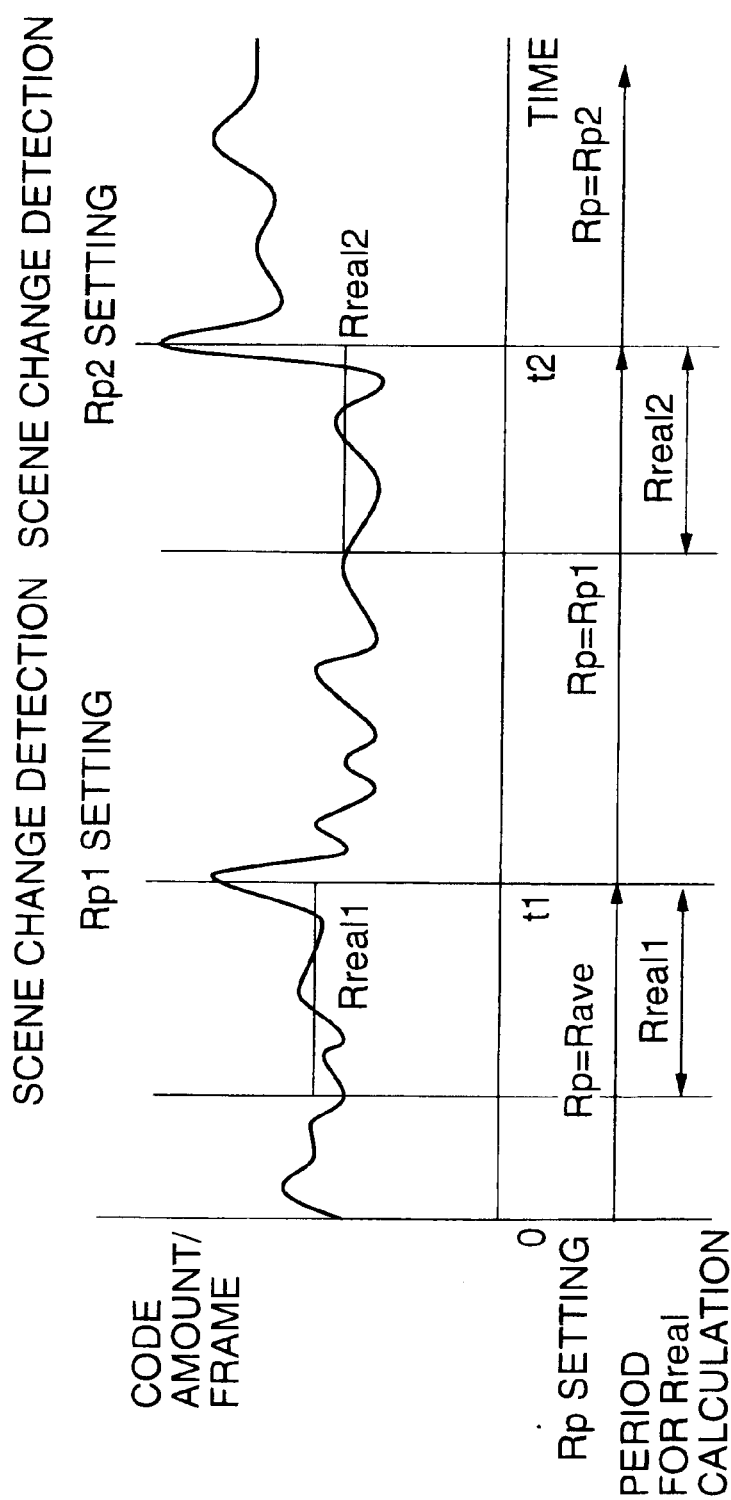
FIG. 8 indicates code amount transition in the fifth preferred embodiment.

Illustrated in FIG. 8 is code amount transition in the fifth embodiment, which shows the relationship between Rreal and Rp setting (updating) period in accordance with transition of code amount for each frame when a new Rreal calculation period is determined on the occurrence of scene change.

Sixth Embodiment

Figure 9:
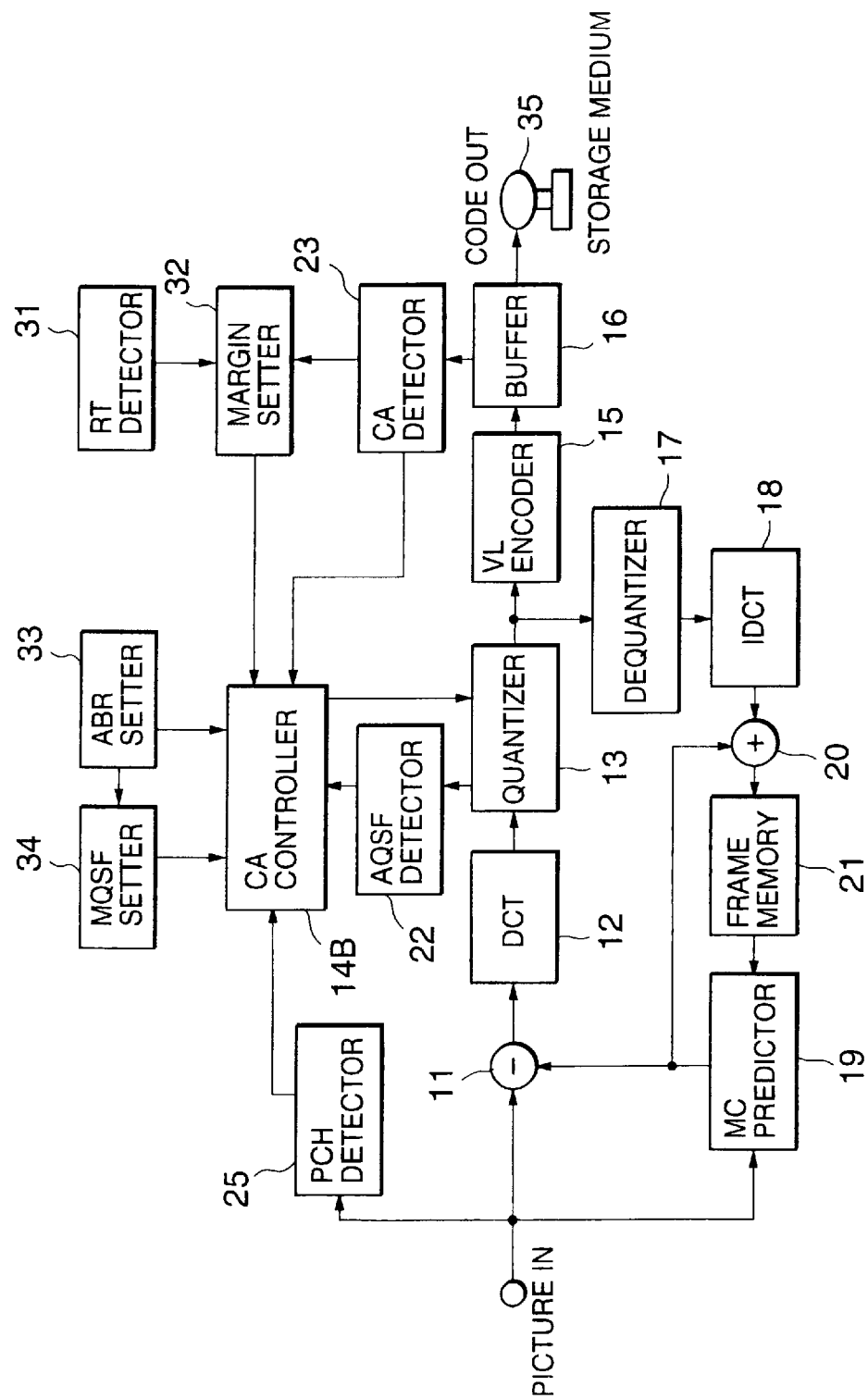
FIG. 9 shows a block diagram of a moving picture encoding apparatus as the sixth preferred embodiment according to the present invention.

A moving picture encoding apparatus as the sixth preferred embodiment according to the present invention is disclosed with reference to FIG. 9.

Elements in this embodiment that are the same as or analogous to elements in the embodiments disclosed so far are referenced by the same reference numbers and will not be explained in detail.

The differences between the first and the sixth embodiments are that the latter is provided with a recording time (RT) detector 31, a margin setter 32, an average bit rate (ABR) setter 33, and a minimum quantization scale factor (MQSF) setter 34, moreover, in the latter, the output of the average quantization scale (AQSF) detector 22 is directly supplied to a code amount (CA) controller 14B, without the picture complexity (PC) calculator 24 (FIG. 1).

As disclosed in the first embodiment, the code amount of each frame is supplied from the buffer 16 to the CA detector 23 for calculation of the actual total code amount over the head to the present frames of a moving picture sequence by sequentially adding the code amount generated for each frame.

The code amount of each frame and the total code amount are supplied to a CA controller 14B. Also supplied to the CA controller 14B is an average quantization scale factor of each frame from the AQSF detector 22.

The ABR setter 33 sets a target average bit rate Rave which is also supplied to the CA controller 14B. The target average bit rate Rave is set for, for example, a storage medium 35, on the basis of the storage capacity and a recording time for a moving picture sequence to be stored; Rave thus corresponding to the average bit rate for fixed bit rate encoding.

The target average bit rate Rave is further supplied to the MQSF setter 34 for minimum quantization scale factor setting. In general, a quantization scale factor over a predetermined level cuases noticeable picture quality degradation. On the other hand, a quantization scale factor below the predetermined level causes almost no picture quality degradation.

The MQSF setter 34 limits a quantization scale factor at a predetermined level so as not to be below the level, to adjusts the generated code amount less than the average bit rate, for achieving stable picture quality and less code amount. Furthermore, the minimum quantization scale factor is adjusted in accordance with an average bit rate supplied by the ABR setter 33 for achieving picture quality suitable for the average bit rate.

The other value supplied to the CA controller 14B is a margin of code amount set by the margin setter 32 for each predetermined period.

A margin of code amount is given to a bit rate or to the total code amount generated for a predetermined period, depending on the parameter, such as, the recording time or the storage capacity of the storage medium 35.

[1] Margin Setting to Bit Rate

Figure 10:
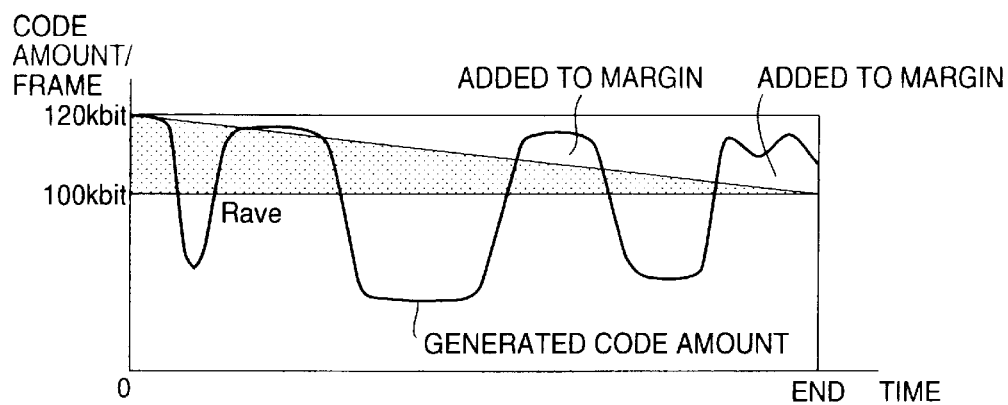
FIG. 10 indicates a relationship between margin distribution and code amount transition in the sixth preferred embodiment.

Illustrated in FIG. 10 is the relationship between margin distribution and code amount transition. A margin is given to a target average bit rate Rave. A margin is expressed as, for example, 10% or 0.4 Mbps for 10% margin when Rave is 4 Mbps.

The RT detector 31 detects a recording elapsing time to obtain a remaining recording time on the basis of the total recording time of a moving picture sequence. The remaining recording time is supplied to the margin setter 32 for code amount margin setting for each predetermined period by using a specific function for setting a margin of code amount that is in proportion to the remaining recording time so that the margin becomes the maximum at the encoding starting time but zero at the encoding finishing time.

The value added to the margin corresponds to a certain percentage of the difference between the actual total code amount of a moving picture sequence which has been encoded up to the present and the code amount generated by encoding performed at the target average bit rate Rave for the period of the moving picture sequence, for obtaining an adequate margin, which would otherwise be not enough, for the later part of the moving picture sequence.

[2] Code Amount Margin Setting to Total Code amount for Predetermined Period

Figure 11:
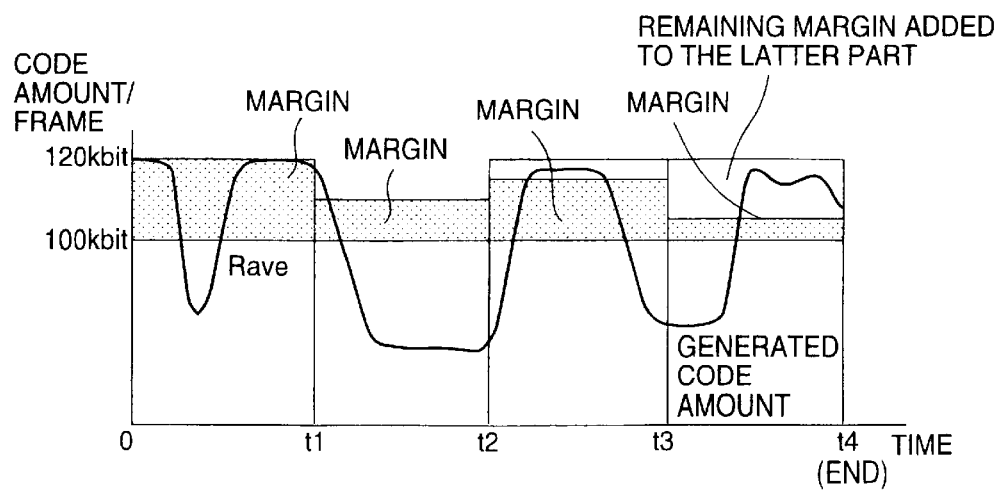
FIG. 11 indicates another relationship between margin distribution and code amount transition in the sixth preferred embodiment.

Illustrated in FIG. 11 is also the relationship between margin distribution and code amount transition. A margin is expressed as, for example, 20% or 0.2 Gbit for the storage medium 35 having 1.0 Gbit as the nominal storage capacity but the actual maximum storage capacity being 1.2 Gbit. This representation is used for a storage medium whose nominal storage capacity is smaller than the actual maximum storage capacity.

The total recording time or an available recording time for a storage medium is divided into predetermined periods. The length of each period may preferably be equal to each other.

The capacity margin of the storage medium 36 is distributed for the predetermined periods. The margin can be distributed in proportion to the length of each period, in detail, it is equally distributed when the length of each period is equal to each other; or it may be distributed more for the former part of a moving picture sequence and gradually less for the latter part with applying margins that remain on the former part to the latter, for achieving effective capacity margin distribution.

The maximum margin to be distributed for each divided period may be the difference between the actual maximum capacity and the nominal capacity of the storage medium 35, for securing that the actual total code amount is smaller than the actual maximum capacity of the storage medium 35.

Or, the maximum margin may be little bit larger than that difference, for improving picture quality of picture portions which are complex enough for encoding, even though there is no securing that the actual total code amount is smaller than the actual maximum capacity of the storage medium 35.

The margin value is converted into another value with respect to the target average bit rate Rave before supplied to the CA controller 14B, like the method [1].

The CA controller 14B performs code amount control to decide a target code amount to be allocated for each moving picture sequence according to, for example, MPEG2 Test Model 5 for code amount allocation to each moving picture sequence when it receives the average quantization scale factor for each frame, the generated code amount for each frame and the total generated code amount, the target average bit rate, the minimum quantization scale factor, and the margin value.

Decision of target code amount to be allocated for each moving picture sequence according to MPEG2 Test Model 5 will be disclosed.

An average code amount to be allocated Ravel for one GOP is obtained by using the following equation:

$$Ravel = (BitRate/PictureRate) \cdot N \quad (19)$$

where BitRate is a bit rate for fixed bit rate control, PictureRate the number of frames per second, and N the number of frames of one GOP (usually an interval between I-pictures).

Then, the code amount to be allocated Rc for one GOP, which is allocated by the CA controller 14B is set by using the following equation:

$$Rc = Ravel + MARGIN \quad (20)$$

where MARGIN is the margin for each GOP.

As understood from these equations, Rc is set or controlled at the bit rate higher by MARGIN than the fixed bit rate control. This results in shortage of code amount by MARGIN, however, achieves the code amount at a predetermined target average bit rate by making up for the shortage of code amount due to the minimum quantization scale factor, with increase in code amount by MARGIN, as disclosed below.

Firstly, the code amount Rc is correctly allocated to each frame of one GOP for calculation of the target code amount of a moving picture sequence which is encoded from now on.

The target code amounts to allocated Ti, Tp and Tb for each picture-type are obtained by using the equations (8), (9) and (10), respectively, where the picture complexity Xi, Xp and Xb for each picture-type are obtained by multiplying the generated code amount and the average quantization scale factor.

Then, the quantization scale factor for each macroblock is decided, according to, for example, MPEG2 Test Model 5 for code amount allocation to each macroblock, on the basis of the target code amounts to be allocated Ti, Tp and Tb for each picture-type and the code amount of each macroblock detected by the buffer 16.

The activity of each input moving picture macroblock is detected by the PCH detector 25 and supplied to the CA controller 14B. The activity values are preferably used for adaptive quantization control to adjust quantization scale factor for each macroblock in MPEG2 Test Model 5. The adaptive quantization control, however, is not a must, or it may be performed by another well known method.

The CA controller 14B compares the quantization scale factor decided for each macroblock with the minimum quantization scale factor supplied from the MQSF setter 34. If the former is larger than the latter, the former is supplied to the quantizer 13 as the quantization scale factor decided for each macroblock; on the other hand, if the former is equal to or smaller than the latter, the minimum quantization scale factor is supplied to the quantizer 13 for quatization of the present picture (DCT coefficients of the input moving picture macroblock or the predictive error macroblock).

The output of the quantizer 13 is encoded by the VL encoder 15 and output from the moving picture encoding apparatus after its code amount is adjusted by the buffer 16.

The quantization scale factor is supplied from the quantizer 13 to the AQSF detector 22 and the generated code amount is supplied from the buffer 16 to the CA detector 23, for code amount control of the next picture.

The CA detector 23 adds the code amounts of the pictures which have been encoded so far to obtain the actual total code amount which is then supplied to the margin setter 32.

The CA controller 14B calculates the difference between the actual total code amount detected by the CA detector 23 and the target code amount (including the total margin obtained by the margin setting method [2] and allocated up to the present picture) for fixed average bit rate encoding, which is obtained by using the recording time and the target average bit rate Rave.

The calculated code amount difference is multiplied by a predetermined constant smaller than 1 and added to the margin supplied from the margin setter 32, for achieving effective code amount control to give an adequate margin to the latter part of a moving picture sequence even if a small margin has been give to the latter part at the initial setting.

Seventh Embodiment

Figure 12:
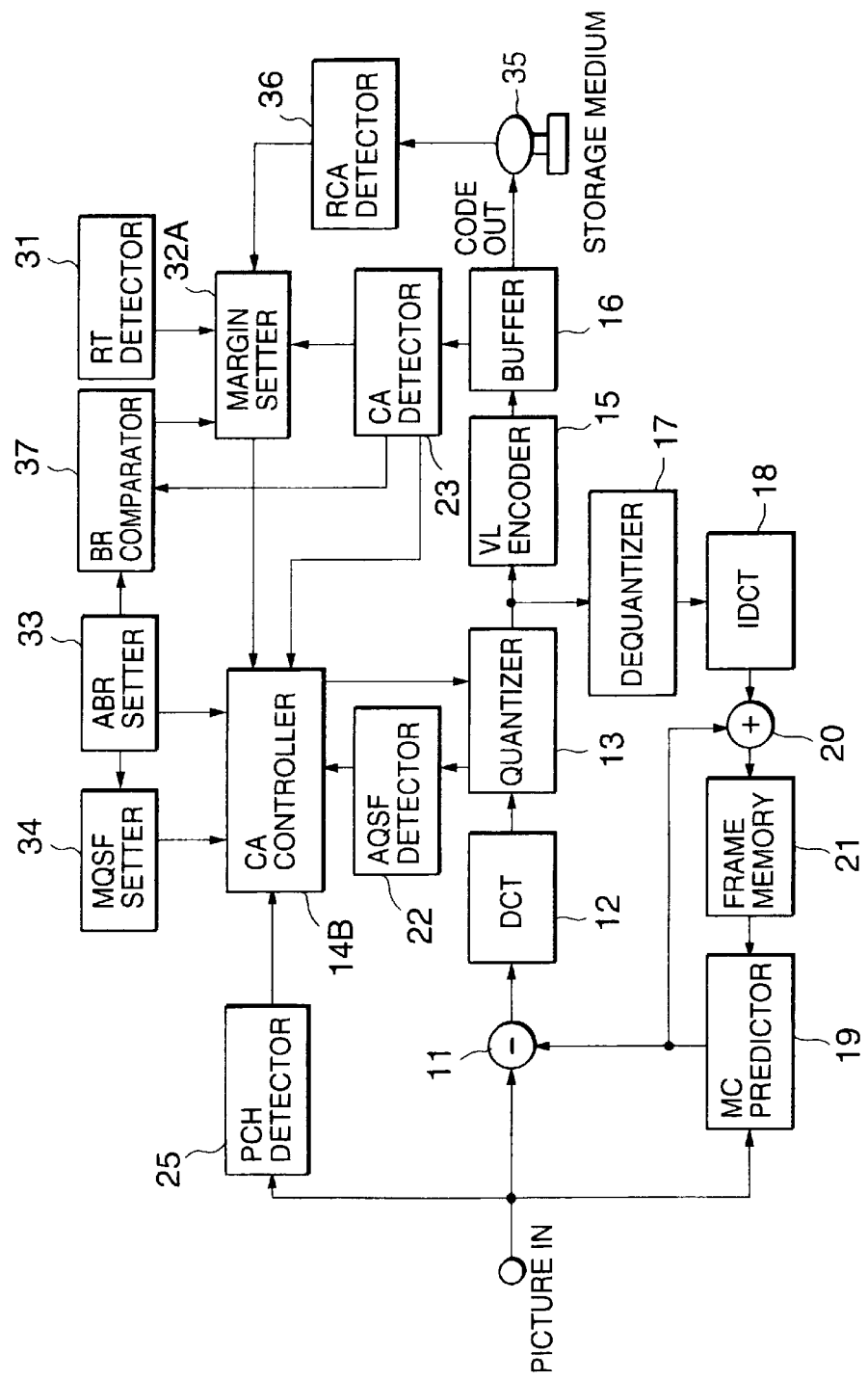
FIG. 12 shows a block diagram of a moving picture encoding apparatus as the seventh preferred embodiment according to the present invention.

A moving picture encoding apparatus as the seventh preferred embodiment according to the present invention is disclosed with reference to FIG. 12.

Elements in this embodiment that are the same as or analogous to elements in the embodiments disclosed so far are referenced by the same reference numbers and will not be explained in detail.

The differences between the sixth and the seventh embodiments are that the latter is provided with a remaining code amount (RCA) detector 36 and a bit rate (BR) comparator 37.

The code amount for each picture is supplied from the CA detector 23 to the BR comparator 37 for calculation of the code amount for a predetermined period to obtain an actual transfer bit rate.

The actual transfer bit rate, a target average bit rate and the maximum transfer bit rate fed by an ABR setter 33A are supplied to a margin setter 32A.

Also supplied to the margin setter 32A is the remaining storage capacity of the storage medium 35 detected by the RCA detector 36. The remaining storage capacity is obtained as the difference between the predetermined maximum storage capacity and the stored code amount detected by a code amount counter (not shown) installed in the storage medium 35 or obtained by converting the addresses of memory areas on which encoded picture data has been stored.

The margin setter 32A further receives the recording time for recording encoded moving picture sequence on the storage medium 35 or the remaining recording time supplied from the RT detector 31.

The margin setter 32A then sets a function having several factors which are selected from the recording time or the remaining recording time, the remaining capacity of a storage medium, the generated code amount, the target transfer bit rate, the maximum transfer bit rate, and actual transfer bit rate, for margin setting to achieve further effective code amount control.

Eighth Embodiment

Figure 13:
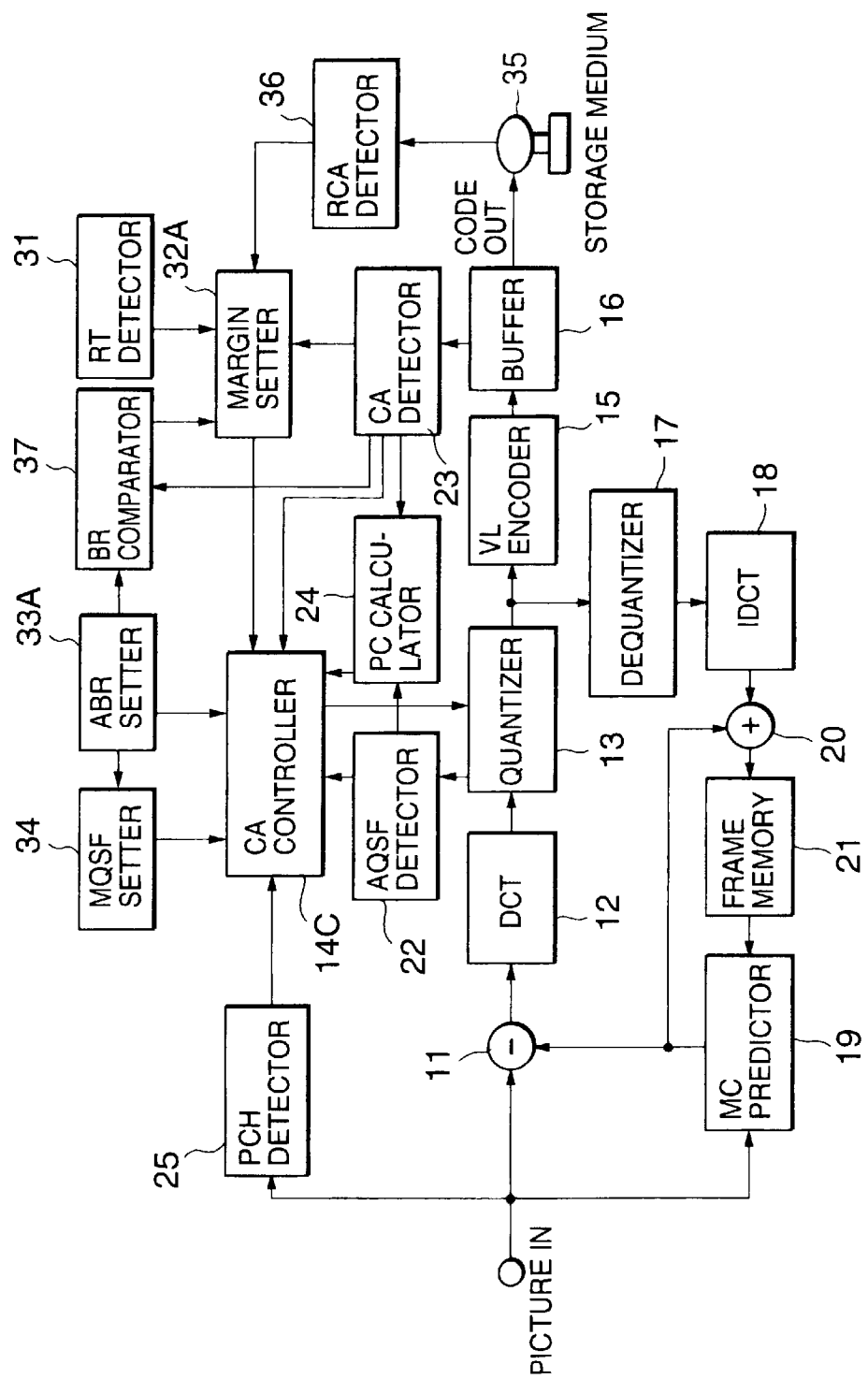
FIG. 13 shows a block diagram of a moving picture encoding apparatus as the eighth preferred embodiment according to the present invention.

A moving picture encoding apparatus as the eighth preferred embodiment according to the present invention is disclosed with reference to FIG. 13.

Elements in this embodiment that are the same as or analogous to elements in the embodiments disclosed so far are referenced by the same reference numbers and will not be explained in detail.

The differences between the seventh and the eighth embodiments are that the latter is provided with the picture complexity (PC) calculator 24 used for, for example, the first embodiment.

The values supplied to the PC calculator 24 for each moving picture sequence are the average quantization scale factor for one frame from the AQSF detector 22, and the code amount of one frame from the CA detector 23.

The code amount and the quantization scale factor are subjected to multiplication and a predetermined conversion to obtain the picture complexity of each frame.

The picture complexity is added for a predetermined period for each picture-type, and then divided by the number of frames of the same picture-type within the predetermined period, to calculate average picture complexity Xi-ave, Xp-ave and Xb-ave of the present I-, P- and B-pictures, respectively.

The average picture complexity Xi-ave, Xp-ave and Xb-ave and the picture complexity Xi, Xp and Xb of I-, P- and B-pictures, respectively, just before the present pictures, are supplied to a code amount (CA) controller 14C.

The other values supplied to the CA controller 14C are the average quantization scale factor, the code amount of each frame and the total code amount up to the present, the target average bit rate, the maximum bit rate, the minimum quantization scale factor, and the margin, for code amount control by code amount allocation for each picture, such as, MPEG2 Test Model 5.

Decision of target allocated code amount by MPEG2 Test Model 5 is the same as that for the sixth embodiment except the equation for obtaining the code amount Rc to be allocated for one GOP.

In eighth embodiment, Rc is obtained not by the equation (20) but by the following equation:

$$Rc = Rave \cdot (Xk/Xk\text{-}ave) + \text{MARGIN} \qquad (21)$$

where K means I-, P- or B-picture.

Like the seventh embodiment, the bit rate obtained by, such as, MPEG2 Test Model 5, is controlled by adding MARGIN to the target average bit rate, so as to be higher than the bit rate for fixed bit rate control, to obtain the target allocated code amount of each present picture.

The target allocated code amount is then multiplied by the value obtained by dividing the picture complexity of the picture encoded just before the present picture by the average picture complexity, for achieving effective code amount allocation under consideration of picture complexity.

The quantization scale factor for each macroblock is decided on the basis of the target allocated code amount for each picture and the code amount of each macroblock detected by the buffer 16, like the sixth and the seventh embodiments.

As disclosed above, the eighth embodiment achieves effective code amount allocation under consideration of picture complexity, which can be applied to the sixth embodiment.

As disclosed above, the present invention offers a method and an apparatus of encoding moving pictures with variable-bit rate control.

Detected first are an amount of codes generated for each predetermined period, an average quantization scale factor, and picture characteristics, such as, activity, of a present picture to be coded and other pictures already coded.

The generated code amount and average quantization scale factor are multiplied and a specific conversion is applied to the multiplication result, to obtain picture complexity. A ratio of activity of the present picture to activity of a past picture encoded just before the present picture of the same picture-type is multiplied with complexity of the past picture, to estimate complexity of the present picture. A ratio of the estimated complexity to average complexity for a predetermined period is applied to code amount allocation based on a target bit rate (code amount).

This code amount allocation achieves one pass-encoding with variable-bit rate control, where the allocation matches change in pictures without signal delay.

The picture characteristics for P- and B-pictures subjected to motion-compensated prediction is detected by using a sum of absolute or square errors of the difference between the present picture to be coded and a reference picture with consideration of variation in motion vectors, thus achieving picture complexity estimation for the picture to be coded, which well matches the encoding characteristics.

In detail, a target bit rate (code amount) for code amount allocation is adjusted or updated on the basis of an actually generated average code amount and the total code amount for a predetermined period, with a target average bit rate as an initial value, thus achieving one pass-encoding with variable-bit rate control with effective code amount allocation.

The complexity of the present picture is estimated by multiplying the complexity of a past picture encoded just before the present picture and the ratio of the picture characteristics of the present picture to that of the past picture. The ratio of the estimated complexity of the present picture and an average picture complexity for a predetermined period is applied to code amount allocation using the target code amount set as described above, thus achieving code amount allocation that sufficiently follows picture variation without signal delay.

Furthermore, scene change is detected to reset the period of an actually generated average code amount for adjusting the target code amount when scene change occurs, thus achieving effective code amount control with low picture quality variation due to variation of target code amount.

Moreover, according to the present invention, code amounts to be allocated to pictures for a predetermined period are decided according to a generated code amount of each picture, a quantization scale factor, a target average code amount, and a margin of code amount.

A margin of code amount varies according to a recording-finished time for which a moving picture sequence has been recorded so far or a remaining recording time. The margin is set so that it is the maximum for the head of the moving picture sequence, it decreases at a predetermined ratio as the sequence runs, and it is zero at for last portion of the sequence.

This margin setting achieves effective code amount allocation in which code amounts will go beyond a predetermined bit rate on the way of the moving picture sequence, but, never go beyond the actual storage capacity of a storage medium.

When a margin of code amount is set for the actual storage capacity of a storage medium, a margin of storage capacity is distributed to each period of a moving picture sequence. Effective margin distribution is achieved by distributing relatively large margin to the head of the sequence, with gradual decrease towards the last portion of the sequence, an excess margin for the head the sequence being given to the latter half of the sequence.

Furthermore, a margin of code amount can be set according to a function having, as factors, a recording-finished time, a remaining recording time, an amount of codes already recorded, a remaining capacity of a storage medium, a target transfer rate, the maximum transfer rate or an actual transfer rate for a predetermined period for further effective code amount control.

Moreover, an average quantization scale factor and generated code amounts of pictures are multiplied each other and applied with a specific conversion to obtain complexity of the pictures. The picture complexity is divided by an average picture complexity for each picture-type for a predetermined period and multiplied to the amount of codes to be allocated as decided as above, thus achieving code amount allocation that sufficiently follows change in picture complexity for one-pass moving picture encoding with variable-bit rate control.

What is claimed is:

1. An apparatus for encoding input moving pictures with motion-compensated prediction, the apparatus comprising:

a code amount detector to detect an amount of codes generated for each encoded picture of the input moving pictures;

a factor detector to detect an average quantization scale factor of quantization scale factors used for quantizing the pictures of the input moving pictures when encoded;

a characteristics detector to detect picture characteristics of at least the input moving pictures;

a calculator, responsive to the amount of codes generated for each picture, the average quantization scale factor and the picture characteristics, to calculate complexity of each picture; and a controller, responsive to the amount of codes generated for each picture, picture characteristics and the complexity of each picture, to decide an amount of codes to be allocated to a present picture to be encoded, for obtaining a quantization scale factor for the present picture.

2. The apparatus for encoding input moving pictures according to claim 1, wherein the calculator calculates complexity of the present picture by calculating complexity of a past picture already encoded just before the present picture with reference to a product of multiplication of the code amount and average quantization scale factor, the present and past pictures being the same picture-type, and multiplying the complexity of the past picture and a ratio of the picture characteristics of the present picture to the picture characteristics of the past picture.

3. Then apparatus for encoding input moving pictures according to claim 1, wherein the controller decides the amount of codes to be allocated to the present picture by multiplying a ratio of the complexity of the present picture to an average complexity of past pictures already encoded before the present picture for a predetermined period and an average amount of codes to be allocated obtained based on a ratio of a target average bit rate and a specific number of pictures of the input moving pictures within the predetermined period.

4. The apparatus for encoding input moving pictures according to claim 3, wherein the calculator calculates the average complexity of the past pictures of the same picture-type as the present picture, and multiplying the average amount of codes to be allocated and a ratio of the complexity of the present picture to the average complexity of the past pictures, for deciding the amount of codes of the present picture.

5. The apparatus for encoding input moving pictures according to claim 1, wherein the characteristics detector further detects picture characteristics of pictures generated by the motion-compensated prediction.

6. The apparatus for encoding input moving pictures according to claim 5, wherein the characteristics detector detects first activity of the input moving pictures and second activity of the pictures generated by the motion-compensated prediction, predetermined different constants being multiplied to the first and second activity, respectively, the constant-multiplied activity being added to each other, for detecting the picture characteristics.

7. An apparatus for encoding input moving pictures with motion-compensated prediction, the apparatus comprising:
 a code amount detector to detect an amount of codes generated for each encoded picture of the input moving pictures;
 a factor detector to detect an average quantization scale factor of quantization scale factors used for quantizing the pictures of the input moving pictures when encoded;
 a characteristics detector to detect picture characteristics of at least the input moving pictures;
 a calculator, responsive to the generated amount of codes and the average quantization scale factor, to calculate complexity of each encoded picture and a present picture to be encoded;
 a code amount decider to decide a target code amount for a predetermined period, based on the generated amount of codes; and
 a controller, responsive to the generated amount of codes generated, picture characteristics, complexity of the picture, and target code amount, to decide an amount of codes to be allocated to a present picture to be encoded, for obtaining a quantization scale factor for the present picture.

8. The apparatus for encoding input moving pictures according to claim 7, wherein the target code amount is decided by using a function having, as a factor, a difference between a predetermined reference average target code amount and an average code amount of the input moving pictures obtained for a first predetermined period, an increase in average code amount based on a ratio of the average code amount to another average code amount of the input moving pictures obtained for a second predetermined period that precedes the first predetermined period, or a difference between a target total code amount obtained by encoding based on the reference average target code amount and a total code amount of the encoded pictures.

9. The apparatus for encoding input moving pictures according to claim 8, wherein the predetermined period for deciding the target code amount and the predetermined period for obtaining average code amount vary according to change in scenes of the input moving pictures.

10. An apparatus for encoding input moving pictures with motion-compensated prediction, the apparatus comprising:
 a code amount detector to detect an amount of codes generated for each encoded picture of the input moving pictures;
 a factor detector to detect an average quantization scale factor of quantization scale factors used for quantizing the pictures of the input moving pictures when encoded;
 an amount setter to set a target code amount based on a recording time for recording the input moving pictures;
 a margin setter to set a margin of the generated amount of codes based on the recording time, the margin being modified based on a difference between the generated amount of codes and the target average code amount; and
 a controller to decide a code amount to be allocated for a predetermined period by adding the margin and the target average code amount, and obtaining a quantization scale factor for a present picture to be coded based on the code amount to be allocated, the present picture being encoded by using the obtained quantization scale factor when larger than a minimum quantization scale factor set based on the target average code amount.

11. The apparatus for encoding input moving pictures according to claim 10, wherein the margin is modified for each of a predetermined period.

12. The apparatus for encoding input moving pictures according to claim 11, wherein the margin is distributed over the moving pictures modified for each predetermined period.

13. The apparatus for encoding input moving pictures according to claim 11 further comprising a calculator to calculate complexity of each picture based on the generated amount of codes and the average quantization scale factor, and to calculate average complexity for a predetermined period, the code amount to be allocated being decided by multiplying the target average code amount and a ratio of the complexity of each picture to the average complexity.

14. The apparatus for encoding input moving pictures according to claim 10, wherein the margin is set based on the recording time, a margin setter to set a margin of the generated amount of codes according to a first period for which encoded pictures have been recorded or a second period obtained by subtracting the first period from the recording time.

15. The apparatus for encoding input moving pictures according to claim 10, wherein the margin is set by using a function having, as a factor, a first period for which encoded pictures have been recorded on a storage medium, a second period obtained by subtracting the first period from the recording time, a remaining storage capacity of the storage medium on which the encoded pictures have been recorded, the target code amount or a maximum code amount set by the amount setter.

16. A method of encoding input moving pictures with motion-compensated prediction, the method comprising the steps of:
 detecting an amount of codes generated for each encoded picture of the input moving pictures;
 detecting an average quantization scale factor of quantization scale factors used for quantizing the pictures of the input moving pictures when encoded;
 detecting picture characteristics of at least the input moving pictures;
 calculating complexity of each picture in response to the amount of codes generated for each picture, the average quantization scale factor and the picture characteristics; and
 deciding an amount of codes to be allocated to a present picture to be encoded in response to the amount of codes generated for each picture, picture characteristics and the complexity of each picture, for obtaining a quantization scale factor for the present picture.

17. The method of encoding input moving pictures according to claim 16, wherein the code amount and average quantization scale factor are detected while the input moving pictures are being encoded, on the other hand, the picture characteristics is detected before the input moving pictures are encoded.

18. A method of encoding input moving pictures with motion-compensated prediction, the method comprising the steps of:

detecting an amount of codes generated for each encoded picture of the input moving pictures;

detecting an average quantization scale factor of quantization scale factors used for quantizing the pictures of the input moving pictures when encoded;

detecting picture characteristics of at least the input moving pictures;

calculating complexity of each encoded picture and a present picture to be encoded in response to the generated amount of codes and the average quantization scale factor;

deciding a target code amount for a predetermined period, based on the generated amount of codes; and deciding an amount of codes to be allocated to a present picture to be encoded, in response to the generated amount of codes generated, picture characteristics, complexity of the picture, and target code amount, for obtaining a quantization scale factor for the present picture.

19. A method of encoding input moving pictures with motion-compensated prediction, the method comprising the steps of:

detecting an amount of codes generated for each encoded picture of the input moving pictures;

detecting an average quantization scale factor of quantization scale factors used for quantizing the pictures of the input moving pictures when encoded;

setting a target code amount based on a recording time for recording the input moving pictures;

setting a margin of the generated amount of codes based on the recording time, the margin being modified based on a difference between the generated amount of codes and the target average code amount;

deciding a code amount to be allocated for a predetermined period by adding the margin and the target average code amount; and obtaining a quantization scale factor for a present picture to be coded based on the code amount to be allocated, the present picture being encoded by using the obtained quantization scale factor when larger than a minimum quantization scale factor set based on the target average code amount.

* * * * *